Figure 1:
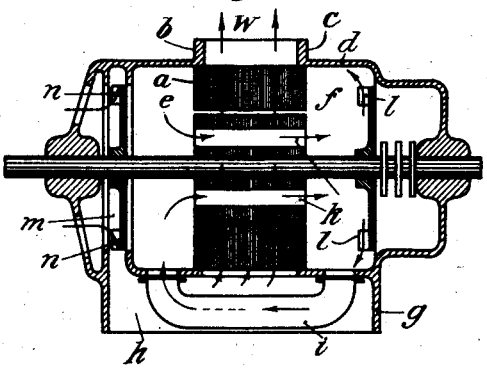

Feb. 26, 1924.

G. LENHARDT ET AL

COOLING MEANS FOR ELECTRIC MACHINERY

Filed Nov. 20, 1920

Inventors
Gustav Lenhardt and Wilhelm Scheiden
by Knight Bros
attorneys

Patented Feb. 26, 1924.

1,484,723

UNITED STATES PATENT OFFICE.

GUSTAV LENHARDT, OF BERLIN-CHARLOTTENBURG, AND WILHELM GSCHEIDLEN, OF BERLIN-SCHMARGENDORF, GERMANY, ASSIGNORS TO SIEMENS-SCHUCKERTWERKE GESELLSCHAFT MIT BESCHRÄNKTER HAFTUNG, OF SIEMENSSTADT, NEAR BERLIN, GERMANY, A GERMAN CORPORATION.

COOLING MEANS FOR ELECTRIC MACHINERY.

Application filed November 20, 1920. Serial No. 425,398.

(GRANTED UNDER THE PROVISIONS OF THE ACT OF MARCH 3, 1921, 41 STAT. L., 1313.)

*To all whom it may concern:*

Be it known that we, GUSTAV LENHARDT and WILHELM GSCHEIDLEN, respectively citizens of the German Empire, residing at Berlin-Charlottenburg, Germany, and Berlin-Schmargendorf, Germany, respectively, have invented certain new and useful Improvements in Cooling Means for Electric Machinery (for which we have filed applications in Switzerland September 9th, 1915, patented March 15th, 1916, No. 72,424; Austria, September 16th, 1915, patented March 29th, 1919, No. 77,978; Germany, August 3rd, 1916, patented April 14th, 1919, No. 318,-797; Germany, October 7th, 1914, and November 14th, 1914; Sweden, December 29th, 1919, patented January 3rd, 1920, No. 53,-449; England, June 28th, 1920, patented October 28th, 1921, No. 146,241; France, March 5th, 1920, patented September 18th, 1920, No. 511,118; and Poland, September 21st, 1920), of which the following is a specification.

Our invention relates to cooling means for electric machinery (generators or motors) in which a current of air is put in circulation in the interior of the machine by means of a fan. This current of air is re-cooled by an external current of air. In the case of the known form of arrangements of this kind, it has, as a rule, been the practice to provide the machine-casing with a double wall, and to conduct the current of air, which is in communication with the air of the atmosphere, along the outer wall faces, and thus to effect the cooling of the current of air circulating within the enclosed interior of the machine. An arrangement of this character makes it necessary to construct such a machine along extraordinarily intricate lines, presenting special difficulties in carrying out the passages leading from the interior of the machine to the outside, without, however, actually being able to obtain thereby an increase of output equal to that of an open machine.

The subject matter of this invention relates to an improved form of construction for enclosed machines, in which the double-walled casing is entirely dispensed with and the shaping of the casing rendered peculiarly simple, while an output may be obtained equal to that of an open machine. This is obtained by means of an arrangement according to which the air of the atmosphere is caused to serve not only for cooling the rear portions of the stator iron within the enclosed machine casing, but also to re-cool the current of air circulating within the casing. In contradistinction to other forms of arrangement, both currents of air, i. e. both the internal as well as the external, are put in circulation by the machine itself, without a double-walled casing, with intricate cast parts, being rendered necessary. Moreover, the entire cooling devices are housed within the interior of the machine. To this end the space available in a machine of the average type is suitably utilized, so that in spite of the complete set of cooling devices provided, the amount of constructional space required is but insignificantly altered. In particular, however, the height of the axis of the machine above its base may remain unchanged relatively to that of the average pattern, a fact of vast importance for a great number of cases in which such machines are employed.

This simple form of construction is secured by the employment of a casing having a single shell as well as by disposing the recooling chamber within the machine, between the feet of the casing. By these means, no special space for the re-cooling device need be arranged beyond the outside contour of the machine, be this below, or at the side or on top. Then again there will result a perfectly simple guiding of the cooling air which assures a good exchange of heat.

Figure 2:
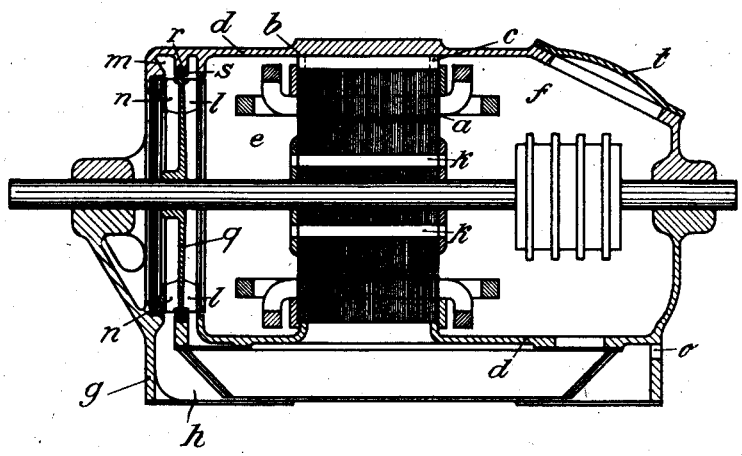
Figure 3:
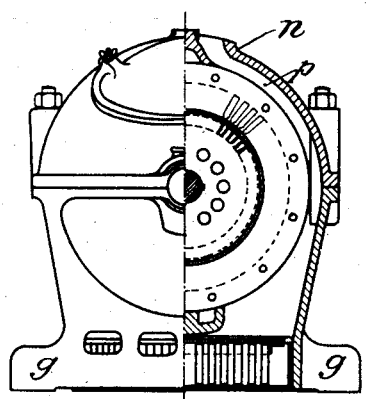

Several embodiments of our invention are shown by way of example in the accompanying drawings, in which:

Fig. 1 is a vertical longitudinal section of one modification,

Fig. 2 a like view of a different modification,

Fig. 3 is a front view, partly in section, of this modification.

Referring to Fig. 1, the casing $d$, is suitably shaped in its interior to support the stator frame $a$. The annular space $p$ formed by the stator frame $a$, the ribs $b$ and $c$ and the annular wall $w$ of the casing communicates with a chamber $h$, disposed between the feet $g$ of the casing, serving for the re-cooling of the air within the apparatus, and traversed by the air of the atmosphere. In addition, this space or chamber $h$ is closed toward the interior of the motor, and contains pipes $i$, disposed in the direction of the axis of the machine, and serving to conduct the air within the apparatus from side $e$ of the machine to the opposite side $f$ thereof. A second connection between the lateral spaces $e$ and $f$ is formed by aid of conduits $k$ arranged in the rotor. The fan $l$ for the air of the interior causes this air to circulate from the one side $f$ of the machine through pipes $i$ to the opposite side and thence back through conduits $k$ towards the side of the fan. Space $h$, which is enclosed on all sides by the feet of the base, communicates on one side with the annular air collecting space $m$ of fan $n$ for the air of the atmosphere. The air supplied by fan $n$ flows through the spaces between the tubes $i$ in the longitudinal direction of the machine, and escapes through the annular space $p$, formed by the outer stator surface, the annular wall $w$ of the casing $d$ and the annular ribs $b$ and $c$.

By means of this arrangement the possibility is afforded of obtaining a very simple form of construction for an enclosed machine having an inside and outside cooling arrangement, which at the same time excels by embodying an extraordinarily favourable cooling action. Those parts of the machine, in which heat is generated to a considerable degree, are brought in intimate contact partly with the air of the atmosphere and partly with the air present in the interior in such a manner that the cooling actions of both air currents will complement each other at the very point where one alone would prove inadequate. The stator segments which cannot be touched by the inner air-flow, on account of their being covered by the cross-connections of the windings, are effectively cooled by the outer air passing their rear surface.

In the arrangement disclosed in Fig. 1, the fans for the internal and external air supply are arranged at the two ends of the machine. A very advantageous arrangement will be obtained in this construction if the two fans are constructed integral with each other, having their respective blades disposed on either side of a common disc $q$, as shown in Fig. 2. This disc is sealed relatively to the wall of the casing by means of a labyrinth packing of well-known construction, which needs merely to consist of a circular groove $r$ formed in the wall of the casing and of a projection $s$ arranged at the disc. Provided the space intermediate these two members be sufficiently small, which may of course be readily obtained, it will be found that this improved arrangement secures a practically air tight closure, preventing the entrance of even the minutest particles of dust.

A special advantage appertaining to this twin-fan arrangement resides in the fact that the disc $q$, which consists of a heat conducting material, will cause a thorough exchange of heat, between the inner and the outer air currents, and will thus materially contribute toward the re-cooling of the air within the machine.

Even leaving aside the fact that in consequence of this construction the construction of the fan is likewise very considerably simplified, there is a further advantage attached thereto, namely that space $f$, which in the case of commutator motors contains the commutator, and in slip ring induction motors the slip rings will now be most conveniently accessible through the spacious inspection hole $t$. It is thus possible, by means of this inspection hole, to constantly control the condition of the most sensitive portions of the interior of the machine, without being in any way disturbed by the presence of an internal fan.

The arrangement according to Figure 2 furthermore shows an opening $o$ in the end wall of the base opposite to the point where the cooling air enters the space which the outer base wall includes. Through this opening $o$ a portion of the cooling air supplied escapes whereby the tubes $i$ are effectively cooled.

The form of construction given to the casing in accordance with this invention makes it possible to divide it in horizontal direction on the line of the machine axis, arranging the upper section of the casing as shown in Fig. 3, so that it may be easily detached without any troublesome dismantling of parts for the purpose of cleaning or repairing.

We claim:

1. A dynamo electric machine having a closed casing, a stator supported in said casing and dividing it into two lateral inner chambers, a rotor having axially extending channels communicating at their ends with said inner chambers, an annular duct formed by the outer stator periphery and portions of the casing and having communication with the outer air, a bottom chamber in said casing located between the feet thereof and having communication with the outer air and with said annular duct, tubular elements located in said bottom chamber in parallel to the machine axis for establishing a second communication between said inner casing chambers and ventilating means for causing air inside of the casing to circulate between the inner chambers, the rotor, and the tubular elements, and also causing outside air to circulate through said bottom chamber past said tubular elements and through said annular duct.

2. A dynamo electric machine having a closed casing, a stator supported in said casing and dividing it into two lateral inner chambers, a rotor having axially extending channels communicating at their ends with said inner chambers, an annular duct formed by the outer stator periphery, the casing and the stator supports having communication with the outer air, a bottom chamber in said casing located between the feet thereof and having communication with the outer air and with said annular duct, tubular elements located in said bottom chamber in parallel to the machine axis for establishing a second communication between said inner casing chambers, and ventilating means for causing air inside of the casing to circulate between the inner chambers, the rotor, and the tubular elements, and also causing outside air to circulate through said bottom chamber past said tubular elements and through said annular duct.

3. A dynamo electric machine having a closed casing, a stator supported in said casing and dividing it into two lateral inner chambers, a rotor having axially extending channels communicating at their ends with said inner chambers, an annular duct formed by the outer stator periphery and portions of the casing and having communication with the outer air, a bottom chamber in said casing located between the feet thereof and having communication with the outer air and with said annular duct, tubular elements located in said bottom chamber in parallel to the machine axis for establishing a second communication between said inner casing chambers and a double ventilator consisting of a disk mounted on the machine shaft at one end of the casing and having vanes on each side, said casing having a groove in which the peripheral edge of said disk rotates to practically keep said casing sealed and ducts leading from the periphery of the outside vanes to said bottom chamber and ducts leading from the periphery of the inside vanes to one end of said tubular elements for the purpose set forth.

4. A dynamo electric machine having a closed casing, a stator supported in said casing and dividing it into two lateral inner chambers, a rotor having axially extending channels communicating at their ends with said inner chambers, an annular duct formed by the outer stator periphery and portions of the casing and having communication with the outer air, a bottom chamber in said casing located between the feet thereof and having communication with the outer air and with said annular duct, tubular elements located in said bottom chamber in parallel to the machine axis for establishing a second communication between said inner casing chambers and ventilating means for causing air inside of the casing to circulate between the inner chambers, the rotor, and the tubular elements, and also causing outside air to circulate through said bottom chamber past said tubular elements and through said annular duct, said closed casing being made in two sections divided in a horizontal plane through the machine axis.

In testimony whereof we affix our signatures.

GUSTAV LENHARDT.
WILHELM GSCHEIDLEN.